United States Patent
Chaudhuri et al.

(10) Patent No.: US 11,468,054 B2
(45) Date of Patent: Oct. 11, 2022

(54) SYSTEMS AND METHODS FOR AUTOMATED ANALYSIS OF BUSINESS INTELLIGENCE

(71) Applicant: JPMorgan Chase Bank, N.A., New York, NY (US)

(72) Inventors: Sutanu Chaudhuri, Glen Mills, PA (US); Mallikharjun R. Bolla, Downingtown, PA (US); Boda Sarath Rao, Chadds Ford, PA (US); Getnet Bayou, Washington, DC (US); Thirumala Raja Dandamudi, Wilmington, DE (US); Josh Abbott, Galena, OH (US); Sheela Colluray, Exton, PA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 595 days.

(21) Appl. No.: 16/437,311

(22) Filed: Jun. 11, 2019

(65) Prior Publication Data
US 2020/0394190 A1    Dec. 17, 2020

(51) Int. Cl.
| G06F 3/048 | (2013.01) |
| G06F 16/2452 | (2019.01) |
| G06F 16/242 | (2019.01) |
| G06F 16/2457 | (2019.01) |
| G06F 16/25 | (2019.01) |
| G06Q 10/06 | (2012.01) |
| G06F 16/248 | (2019.01) |
| G06F 3/0482 | (2013.01) |
| G06F 40/279 | (2020.01) |

(52) U.S. Cl.
CPC ...... *G06F 16/24522* (2019.01); *G06F 3/0482* (2013.01); *G06F 16/243* (2019.01); *G06F 16/248* (2019.01); *G06F 16/24578* (2019.01); *G06F 16/252* (2019.01); *G06F 40/279* (2020.01); *G06Q 10/063* (2013.01)

(58) Field of Classification Search
CPC ............ G06F 16/24522; G06F 16/243; G06F 16/24578; G06F 16/248; G06F 16/252; G06F 40/279; G06F 3/0482; G06Q 10/063
See application file for complete search history.

(56) References Cited

U.S. PATENT DOCUMENTS

| 10,546,001 | B1 * | 1/2020 | Nguyen | G06N 20/00 |
| 2013/0238612 | A1 * | 9/2013 | Tsongas | G06F 16/9535 707/723 |
| 2014/0236579 | A1 * | 8/2014 | Kurz | G06F 16/3344 704/9 |
| 2017/0160813 | A1 * | 6/2017 | Divakaran | G06K 9/00335 |
| 2018/0052929 | A1 * | 2/2018 | Liu | G06F 16/951 |
| 2018/0121500 | A1 * | 5/2018 | Reschke | G06F 16/243 |
| 2020/0272644 | A1 * | 8/2020 | Canedo | G06F 16/248 |

* cited by examiner

*Primary Examiner* — Rashawn N Tillery
(74) *Attorney, Agent, or Firm* — Greenblum & Bernstein, P.L.C.

(57) ABSTRACT

An embodiment of the present invention is directed to a user friendly dynamic tool for business intelligence automated analytics that enable end users, e.g., employees, etc. to maximize efficiency and flexibility while interacting with data systems across applications. An embodiment of the present invention provides real-time analytics based on Artificial Intelligence (AI) and an interactive Chatbot interface. The innovative framework may be applicable across various lines of business and scenarios.

20 Claims, 3 Drawing Sheets

SYSTEMS AND METHODS FOR AUTOMATED ANALYSIS OF BUSINESS INTELLIGENCE

FIELD OF THE INVENTION

The present invention generally relates to systems and methods for automated analysis of business intelligence.

BACKGROUND OF THE INVENTION

Often, end users of business intelligence/reporting tools, or similar web interfaces, need to wait a considerable amount of time, ranging from hours to days, to get an ad-hoc report that may not be available through a user interface. For reports that are available, user friendly features are limited and often require extensive Human Computer Interaction, which means a user is often required to click on several tabs/buttons, or navigate through different link and sources like Help Desk or Subject Matter Expert to retrieve the required information or customized reports. For example, when a user is looking for specific information, such as "How many transactions of less than $20 did I make in the last 6 months?" or "How many user stories are completed in my project?", the user approaches the help desk who in turn approaches production support team, or development team that will frame the relevant query and execute the query against one or more databases.

This flow has security risks with the script executioner able to see the data, which may be sensitive. In addition, there is no learning involved in the current process with the knowledge confined to the developer or production support personnel which may lead to potential single point of failure. Further, the solution gathered is not real time data due to the time and effort involved. Additionally, the queries are often repetitive and not dynamic and have little, if any, possibility for reuse.

SUMMARY OF THE INVENTION

According to one embodiment, the invention relates to a system for automated analysis of business intelligence. The system comprises: a query interface configured to receive a natural language user input a natural language understanding processor comprising a parser and interpreter to determine a user intent and generate an intermediate query and further based on a context manager; a query processor configured to translate the intermediate query to a database query and execute the database query against a database; and a presentation interface configured to generate a result output that comprises results of the database query in natural language.

According to another embodiment, the invention relates to a method for automated analysis of business intelligence. The method comprises the steps of: receiving, via a query interface, a natural language user input; determining, via a natural language understanding processor comprising a parser and interpreter, a user intent; generating an intermediate query and further based on a context data from a context manager; translating, via a query processor, the intermediate query to a database query and executing the database query against a database; and generating, via a presentation interface, a result output that comprises results of the database query in natural language.

The system may include a specially programmed computer system comprising one or more computer processors, interactive interfaces, electronic storage devices, and networks.

The computer implemented system, method and medium described herein provide unique advantages to entities, organizations and other users, according to various embodiments of the invention. An embodiment of the present invention provides real-time analytics based on Artificial Intelligence (AI) and an interactive Chatbot feature. The innovative framework is directed to minimizing Human-Computer Interaction (HCI) to prevent and/or minimize user dissatisfaction by improving relevancy of reports and minimizes effort and time involved to generate the reports by utilizing Analytics tool. Further, the inventive tool reduces cognitive load associated with complex HCI. Additionally, significant benefits such as, tightened data security, elimination of single point of failure, access to relevant and real time analytics, customizable report formats (e.g., PPT, XLS, Word, etc.), formatting features, ability to bookmark frequently used reports may be available in comparatively lesser time and effort than a traditional business intelligence (BI) tool.

These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION OF PREFERRED EMBODIMENTS

Figure 1:
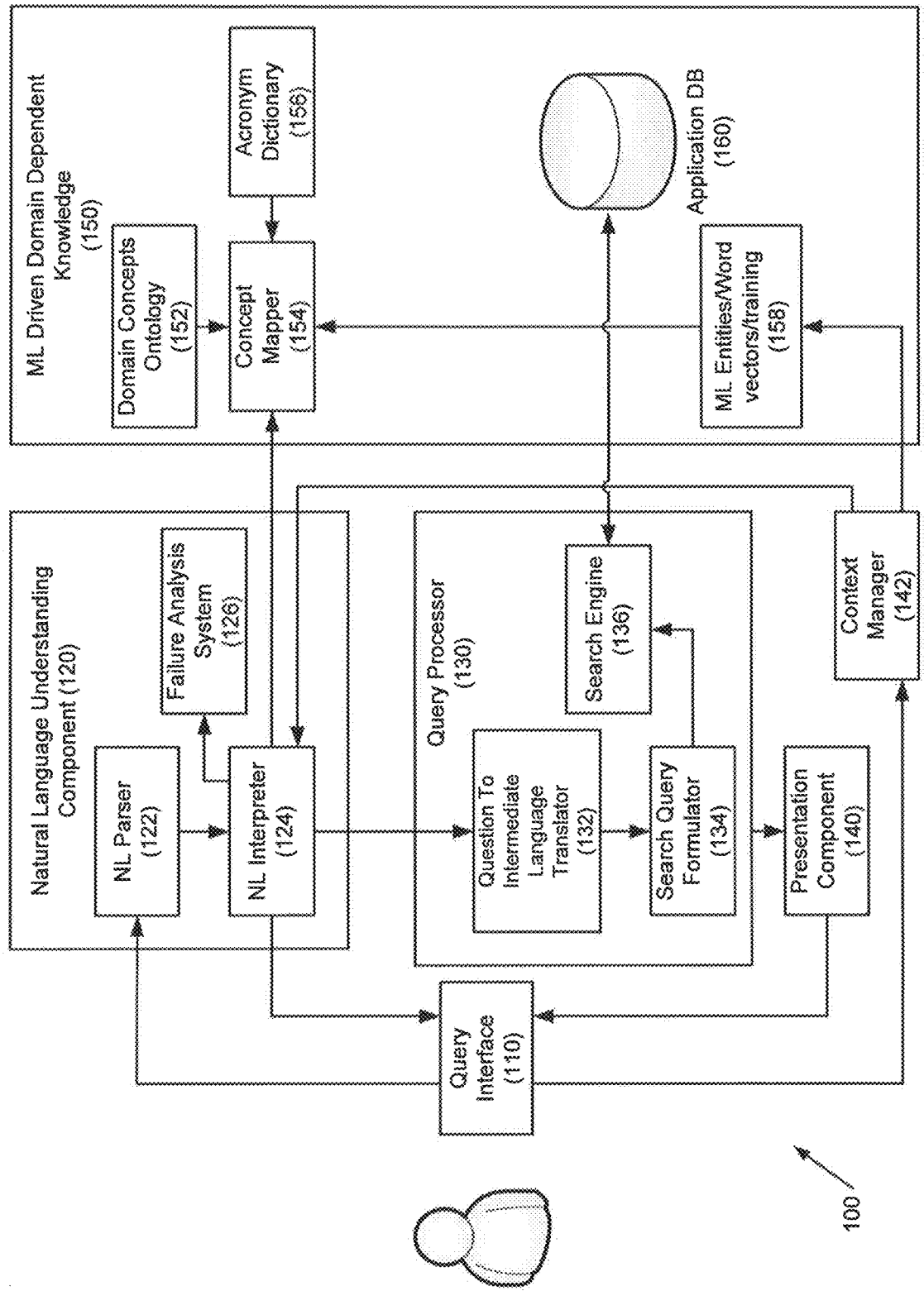
FIG. 1 depicts a system for automated analysis of business intelligence, according to an embodiment of the present invention.

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to a user friendly dynamic tool for business intelligence automated analytics that enable end users, e.g., employees, etc. to maximize efficiency and flexibility while interacting with data systems across applications. An embodiment of the present invention provides real-time analytics based on Artificial Intelligence (AI) and an interactive Chatbot interface. The innovative framework may be applicable across various lines of business and scenarios.

The framework capabilities, including ML and AI, lead to a continuous learning process where the tool may be self-trained based on user search pattern and queries. Accordingly, the tool may accurately determine a user's intent with partial queries and further provide the user with choices for any further relevant information.

Embodiments may incorporate a conversational AI program (e.g., Chatbot) using Natural Language Interface to Database ("NLIDB") to return real-time information to end users. Embodiments may promote customer-focused instant analytics, accurately determine an end user's needs from a business intelligence perspective, reduce operational costs, effectively use machine learning, and provide different options to export the one or more results.

Embodiments may solve context-specific questions based on a prior question, historical information and/or analysis and may be intuitive to respond to partial queries from an end user. Using machine learning, embodiments may determine a specific intent or need of the user question and provide an optimal and proactive response. In addition, an embodiment of the present invention may respond to partial queries that may be based on prior questions and/or prior interactions.

Embodiments may translate a natural language query provided through an interface (e.g., a Chatbot interface, user input, etc.) to a database query (e.g., Structured Query Language (SQL), other database query language, etc.) that is able to understand various statistical operations, including but not limited to "where, when, what, who" type of questions referenced in the natural language query, while translating the input to an intermediate query. The intermediate query may then be converted to a specific database query to be executed against the database. The result set from the executed query may be translated back to an intermediate language and then to a natural language response or a graphical representation depending on the context. Other outputs and/or formats may be supported.

Embodiments may use an initial or one-time training imparted through machine learning algorithms to teach the concepts and the intents. The concepts and/or intents may be specific to a database language. This may include various queries that may be supported and/or other specifics. For example, the training may be specific to the database query language. Accordingly, different database query languages may have different training algorithms that may be applied. Alternative interpretations may be provided in the query interface to assist the user in choosing a more meaningful question. Embodiments assume that the user's query is dynamic by nature, and may start with an exploratory query. A context manager may sequentially track recent queries by the user, or by a user with a similar intent, and may use probabilistic methodologies to identify the intent behind the query.

Embodiments are scalable and may be introduced in any reporting tool with plugins to connect to respective databases. The reporting tool where the plugin is targeted may be configured to provide the corpus in a predefined format. For example, metadata related to a table may declare whether a particular column type is PERSON, LOCATION, CURRENCY, TIME, or other domain specific entities, assuming an exhaustive list of such data definitions is exposed.

According to an embodiment of the present invention, an intermediate query tree may be tagged to a security context in order to assess whether a query intent has the necessary entitlements, access and/or rights granted to the logged in user profile.

According to an embodiment of the present invention, an interface may be provided to certain users to teach new concepts or intents based on the learned concepts.

Embodiments may subscribe to specific queries, with the interface (e.g., the Chatbot) providing specific information at the time of access, and/or tagging an interesting insight against another profile or public profile for further consumption.

FIG. 1 depicts a system for automated analysis of business intelligence, according to an embodiment of the present invention. System 100 may include query interface 110 that receives a query from a user; natural language (NL) understanding component 120, query processor 130, presentation component 140, context manager 142, and machine language (ML) driven domain dependent knowledge 150.

In one embodiment, query interface 110 may be hosted or executed on an electronic device, e.g., desktop computer, workstation, tablet computers, smart phones, smart watches, Internet of Things (IoT) appliances, web-accessible devices, etc.

Natural language understanding component 120 may include NL parser 122, which may receive the query from query interface 110 and parse the query into a NL parser tree or other structure, which may include parts-of-speech tag sets that may be further mapped to statistical query variables and/or corpus synonyms. NL parser 122 may communicate with NL interpreter 124, which may interpret the parsed query, and to failure analysis system 126 that receives the NL interpretation and identifies any failures in the parsing and/or interpretation for further human intervened analysis and refinement of the model.

Query processor 130 may receive the interpretation from NL interpreter 124, and then translate the interpretation into an intermediate language. Search query formulator 134 may generate a search from the intermediate language, and may provide the formulated query to search engine 136. Natural language parser 122 may be responsible for tokenizing the sentence, lemmatization, removing stop words relevant to the domain while retaining statistical keywords and corpus related entities create parts-of-speech tagger tree, and propagating the parsed object to NL interpreter 124. NL interpreter 124 may be context agonistic and may not have the historic knowledge of the conversation flow.

In one embodiment, NL Interpreter 124 may use trained Hidden Markov Models ("HMM") while including serialized context from Context Mapper 142 and consulting Concept Mapper (154) to predict the right intent. In one embodiment, NL interpreter 124 may have multiple ranked intents with the top ranked intent being propagated to intermediate language translator 132. Other models may be implemented.

ML driven domain dependent knowledge 150 may include domain concepts ontology 152, concept mapper 154, acronym dictionary 156, ML entities/word vectors/training 158, and application database (DB) 160.

Domain Concepts Ontology 152 may represent a repository of labelled entities' relevant statistical definitions, such as minimum, maximum, average, percentage, and domain specific entities, and may map database table and column definitions to a pre-defined category. For example, the repository may include metadata related to each of the tables, elaborating on how data column and data table should be mapped to different entities for the domain.

As a non-limiting illustration, Column A in Table X may be mapped to PERSON, while Column B may be mapped to a LOCATION. Acronym dictionary 156 may keep track of the synonyms related to entities for the domain where the system is hosted.

The architecture may be generic and may cater to different business domains varying from mortgage to workforce management.

Search engine 136 may interface with application DB 160. For example, application DB 160 may store and manage data relevant to the business domain where the system would be hosted, serialized context, historic conversational data and any feedback received by the user explicitly or implicit.

Presentation component 140 may include translators responsible for converting the result set after executing the NLIDB query into a sentence with grammatically correct semantics. Presentation component 140 may represent an interactive user interface. For example, Presentation component 140 may render a graph, chart, textual response and/or other output back to the channel from where the query was generated.

Context manager 142 may be responsible for tracking a history of a conversation through, for example, chatbot memory spanned across multiple slots. For example, values stored in context manager 142 may be passed to NL interpreter 124. Similarly, while sending the result set back to presentation component 140, context manager 142 may keep track of an estimated accuracy for and confidence in what is being sent in the response. Feedback from query interface 110 may pass through context manager 142, which may then modify the ranking of possible responses.

In addition, Context manager 142 may tract user actions and interactions from query interface 110, which may include background requests. Context manager 142 may determine user preferences (e.g., user likes or dislikes) including navigational history of the responses, etc. For example, a user swiftly scrolling through some response graphs may indicate the user is ignoring the response while a longer time may indicate the user is interested in the details. In this example, feedback may be redirected through context manager 142. In response to the user's interaction (e.g., type of scrolling, etc.), presentation component 140 may generate a corresponding output, such as dynamic charts based on the ranked responses instead of providing all possible responses at one time.

While a single component is shown in FIG. 1, each component may represent a plurality of components. FIG. 1 is a representation example of an architecture. Other variations may be implemented. The system of FIG. 1 may be implemented in a variety of ways. Architecture within system may be implemented as hardware components (e.g., module) within one or more network elements. It should also be appreciated that architecture within system may be implemented in computer executable software (e.g., on a tangible, non-transitory computer-readable medium) located within one or more network elements. Module functionality of architecture within system may be located on a single device or distributed across a plurality of devices including one or more centralized servers and one or more mobile units or end user devices. The architecture depicted in system is meant to be exemplary and non-limiting. For example, while connections and relationships between the elements of system are depicted, it should be appreciated that other connections and relationships are possible. The system described below may be used to implement the various methods herein, by way of example. Various elements of the system may be referenced in explaining the exemplary methods described herein.

Figure 2:
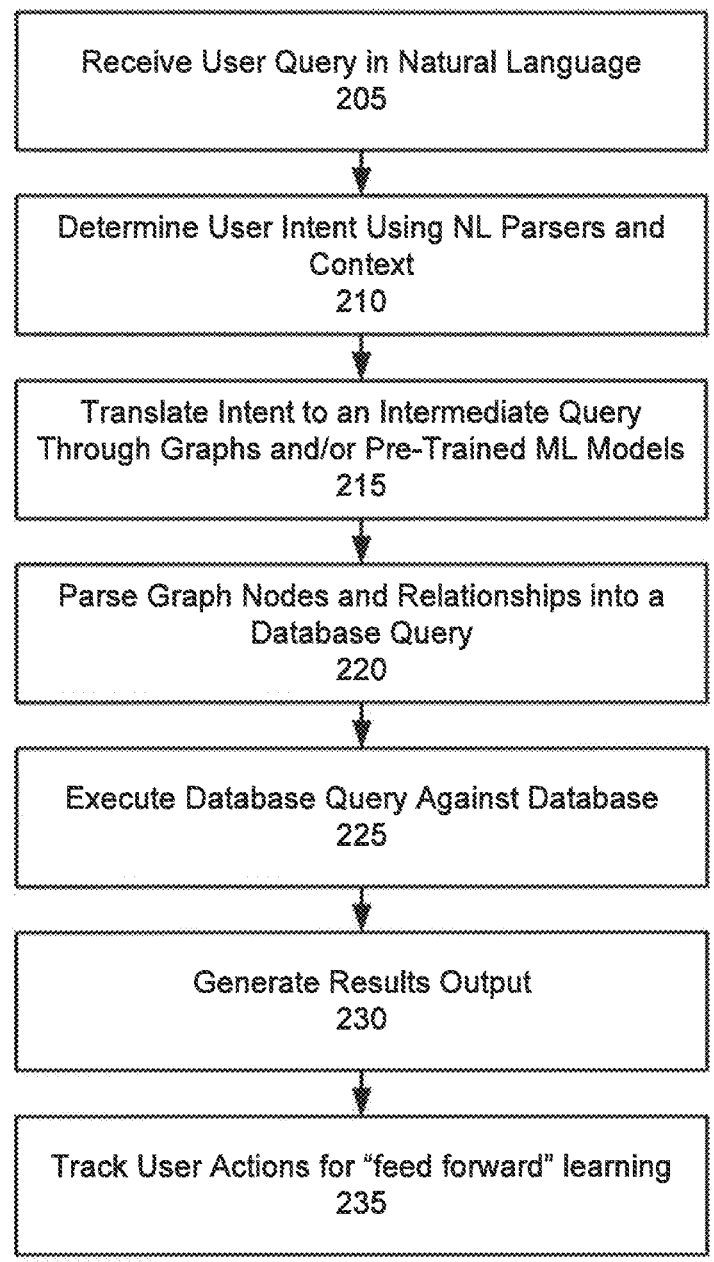
FIG. 2 depicts a method for automated analysis of business intelligence, according to an embodiment of the present invention.

FIG. 2 depicts a method for automated analysis of business intelligence, according to an embodiment of the present invention. At step 205, a user query in natural language may be received. At step 210, an embodiment of the present invention may determine user intent using NL parsers and context information. At step 215, the user intent may be used to determine an intermediate query through graphs and/or pre-trained ML models. At step 220, graph nodes and relationships may be parsed into a database query. At step 225, the database query may be executed against a database. At step 230, results output may be generated and displayed to the user. At step 235, user actions may be tracked for improved accuracy through machine learning. The order illustrated in FIG. 2 is merely exemplary. While the process of FIG. 2 illustrates certain steps performed in a particular order, it should be understood that the embodiments of the present invention may be practiced by adding one or more steps to the processes, omitting steps within the processes and/or altering the order in which one or more steps are performed.

An embodiment of the present invention is directed to supporting querying various data sources through a natural language input.

At step 205, a user may enter a query in natural language into a query interface (e.g., an application, program, browser, etc.) executed on an electronic device. Examples may include: "How many transactions did I make less than $20 in last 6 months?"; "How many MDs are located in Brooklyn?"; "How many user stories are completed in my project ABC?"; "What is the cash to credit spend ration on travel expenses?" The user input may be in text format, voice format and/or other type of communication. The input may be received and/or inferred from a separate interaction or application. For example, an input sentence or phrase may be tokenized to identify various tokens. A context manager may identify and/or enrich the input with additional context.

At step 210, the system may determine the user's intent of the query. For example, the system may extract the intent of the query using NL parsers. A machine learning model may include a number of intents with training examples attached thereto. As a part of a conversation with the chatbot, the user may be engaged in a dialog flow. Each time a new question is asked, the Chatbot may determine intent based on a probabilistic model, whether the new query is related to one of the previous queries that have been saved in chatbot's memory based on a similarity ratio.

For example, a parser library may be used to perform parsing. Grammatical relations may be extracted using a pre-trained machine learning model. For example, nouns and prepositions may be extracted from a Parts of Speech Tagger and Typed Dependencies. An embodiment of the present invention may apply semantic analysis with nouns and prepositions. A graph tree may be constructed with the nouns as nodes with prepositions and typed dependencies as edges of graph.

The system may perform various permutations and combinations by substituting features in a parsed tree with features that are stored in its memory slots. A substituted feature that gives a better representation of intent may be selected as a "winner" and then forwarded to the next component in a pipeline. A substituted feature that leads to a lower probabilistic model may be kept in a memory graph and assigned a lower rank. The feature may also be discarded when the probability assigned reaches a lower threshold, for example.

At step 215, the intent may be translated into an intermediate query using graphs and/or pre-trained ML models. For example, the training model may include at least some of the following components: intents, which may be further categorized as "what-when-where, who, which" questions; statistical determiners (e.g., maximum, minimum, average, median, mode, count, percentage, ratio, etc.), a series of examples to distinguish intents, synonyms, etc. The training model may be trained to understand the depth and/or level of the natural language query based on different training examples.

At step 220, the graph nodes and relationships may be parsed into a database query using, for example, adapters (e.g., Oracle, SQL, etc.). For example, a rules engine may convert the intermediate query into a database query. In one embodiment, a SQL syntax may be governed by rules specific to the language (e.g., Oracle, MSSQL, etc.). An intermediate language parser may generate a database query being mapped from the adapter itself. While registering a parser with the component, details relevant to the syntax of a SQL query may be provided.

For example, a graph may be converted to a SQL query using a Database Adapter. The graph may also be used generate alternative models behind or beyond the question.

At step 225, the database query may be executed against a database and/or other data sources. For a particular database, a specific set of queries and/or statements may be permitted. In an example involving SQL, only GET or SELECT queries may be permitted for an analytical query. In this example, UPDATE, DELETE, and INSERT may not be permitted. Other variations may be applied and other scenarios may be implemented.

At step 230, the results of the query may be generated. For example, the results may be converted to graph and ultimately a natural language response, e.g., text, plot, etc. The response may be provided as a textual response, as a plot, chart or graph, or in any other suitable format as is necessary and/or desired.

For example, conversion of the graph to a NL Query may ensure that the user receives the data in a natural language format rather than a single word response. This may be particularly important for questions, where users may expect a binary response, but the chatbot may provide additional details, such as explaining the reasoning behind the binary response. Response templates may be mapped to question intent with the placeholders being populated by the component.

At step 235, the user actions in response to the response may be tracked and used for "feed forward" learning. For example, the user's actions may be applied to future queries by the user to further refine the query. During user interaction, the chatbot may collect information relevant to the kind of transition that is occurring during the conversations with respect to nature of the question asked, how much time the user is spending reviewing and selecting a response, any feedback provided by the user, explaining which of the ranked response appear more relevant, the amount of time spent in each of the response screens, what users with similar traits are showing interest in, etc.

For example, the result set may be transformed into various formats, including grid, chart and/or textual view. The Graph representation of the intermediate query in a simplified format, the actual question asked, and the response may be sent back to the user interface. The amount of time spent by the user in each grid and the feedback button clicked, e.g., Bookmark, Incorrect, Correct or More options, may then be stored for further training and reinforced learning.

In a probabilistic model, a NL interpreter may rank the various scenarios based on feedbacks received on the above parameters.

For example, a user may input a first question including "How many SW Eng work from DE?" A second question may be "From Jersey City?" In this example, an embodiment of the present invention may determine entities as "worker, location and jobfamily."

Figure 3:
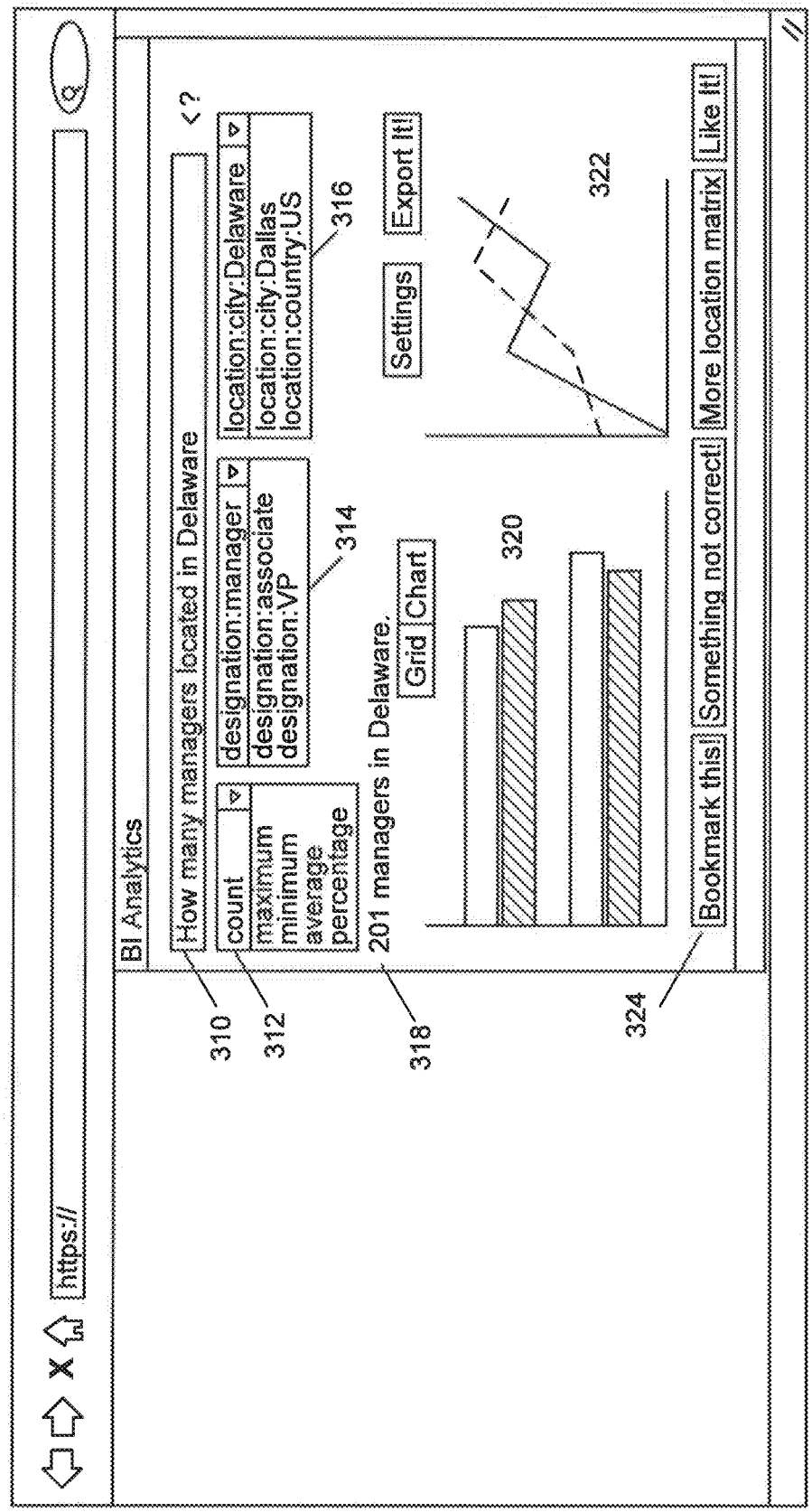
FIG. 3 is an exemplary user interface, according to an embodiment of the present invention.

FIG. 3 is an exemplary user interface, according to an embodiment of the present invention. As shown in FIG. 3, SQL queries may be executed against a database. At input 310, a user may enter a query in natural language. The input may be entered by the user via text or voice, selected from a set of options and/or other input or command. Additional specifics may be provided at 312, 314 and 316. These inputs may be predetermined and available via drop down windows. Other inputs may be provided. The result set may be transformed into various formats, including text 318, grid 320 and chart 322. The Graph representation of the intermediate query in a simplified format, the actual question asked, and the response may be sent back to the user interface. In addition, user interactions may be captured. For example, the amount of time spent by the user in each grid and the feedback button clicked, e.g., Bookmark, Incorrect, Correct or More options represented by 324, may be stored for further training and reinforced learning.

It should be recognized that although several embodiments have been disclosed, these embodiments are not exclusive and aspects of one embodiment may be applicable to other embodiments.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, from automated scheduling, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, Phyton, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A system for automated analysis business intelligence comprising:
   a query interface to receive a natural language user input;
   a natural language understanding processor, including a parser and an interpreter, to determine a user intent based on the natural language user input,
      wherein, upon a successful determination of the user intent, generating an intermediate query based on a context manager, and upon an unsuccessful determination of the user intent, based on an identified failure in one or more of parsing and interpreting, sending the identified failure to a failure analysis system for human intervened analysis and refinement of a natural language model used by the natural language understand processor;
   a query processor configured to translate the intermediate query to a database query and execute the database query against a database;
   a presentation interface configured to generate a result output that comprises results of the database query in natural language; and
   a context manager processor configured to track user interaction with the generated result output, perceive an interest of the user with one or more portions of the generated results based at least on the scrolling speed of the user through the generated results, and further refine the generated results based on the perceived interest.

2. The system of claim 1, wherein the query interface is provided on an electronic device.

3. The system of claim 1, wherein the query is received in a dialog with a plurality of interactions with a chatbot.

4. The system of claim 1, wherein the interpreter is in communication with the context manager and a concept mapper that receives inputs from a domain concept ontology and an acronym dictionary.

5. The system of claim 1, wherein the natural language understanding processor applies one or more entitlements to generate the intermediate query.

6. The system of claim 1, wherein the database query is a SQL query.

7. The system of claim 1, wherein the query processor further parses one or more graph nodes and relationships to generate the database query.

8. The system of claim 1, wherein the interpreter identifies a plurality of intents that a ranked.

9. The system of claim 1, wherein one or more user actions associated with the result output are tracked.

10. The system of claim 1, wherein the one or more user actions comprises a type of scrolling by the user.

11. A method for automated analysis of business intelligence, the method comprising:
   receiving, via a query interface, a natural language user input;
   determining, via a natural language understanding processor, a parser, and an interpreter, a user intent based on the natural language input,
      wherein, upon a successful determination of the user intent, generating an intermediate query based on a context manager, and upon an unsuccessful determination of the user intent, based on an identified failure in one or more of parsing and interpreting, sending the identified failure to a failure analysis system for human intervened analysis and refinement of a natural language model used by the natural language understand processor;
   translating, via a query processor, the intermediate query to a database query and executing the database query against a database;
   generating, via a presentation interface, a result output that comprises results of the database query in natural language; and
   perceiving, via a context manager processor, an interest of the user with one or more portions of the generated results based at least on the scrolling speed of the user through the generated results; and refining a generated result output based on the perceived interest.

12. The method of claim 11,
wherein the query interface is provided on an electronic device.

13. The method of claim 11,
wherein the query is received in a dialog with a plurality of interactions with a chatbot.

14. The method of claim 11,
wherein the interpreter is in communication with the context manager and a concept mapper that receives inputs from a domain concept ontology and an acronym dictionary.

15. The method of claim 11,
wherein the natural language understanding processor applies one or more entitlements to generate the intermediate query.

16. The method of claim 11,
wherein the database query is a SQL query.

17. The method of claim 11,
wherein the query processor further parses one or more graph nodes and relationship to generate the database query.

18. The method of claim 11,
wherein the interpreter identifies a plurality of intents that are ranked.

19. The method of claim 11,
wherein one or more user actions associated with the result output are tracked.

20. The method of claim 11,
wherein the one or more actions comprises a type of scrolling by the user.

* * * * *